US012226667B2

(12) United States Patent
Hanfland (10) Patent No.: US 12,226,667 B2
(45) Date of Patent: Feb. 18, 2025

(54) OMNIDIRECTIONAL TREADMILL SYSTEM

(71) Applicant: Mark Joseph Hanfland, Brentwood, TN (US)

(72) Inventor: Mark Joseph Hanfland, Brentwood, TN (US)

( * ) Notice: Subject to any disclaimer, the term of this patent is extended or adjusted under 35 U.S.C. 154(b) by 37 days.

(21) Appl. No.: 18/097,831

(22) Filed: Jan. 17, 2023

(65) Prior Publication Data
US 2023/0226404 A1 Jul. 20, 2023

Related U.S. Application Data

(60) Provisional application No. 63/300,083, filed on Jan. 17, 2022.

(51) Int. Cl.
*A63B 22/02* (2006.01)
*A63B 24/00* (2006.01)

(52) U.S. Cl.
CPC .......... *A63B 22/02* (2013.01); *A63B 24/0087* (2013.01); *A63B 2022/0271* (2013.01); *A63B 2024/0096* (2013.01); *A63B 2220/806* (2013.01)

(58) Field of Classification Search
CPC ............... A63B 22/02; A63B 24/0087; A63B 2022/0271; A63B 2024/0096; A63B 2220/806; A63B 2024/009; A63B 2220/05; A63B 22/025; A63B 71/0054; A63B 21/4035; A63B 2225/74; A63B 2230/208; A63B 2230/505; A63B 21/005; A63B 21/008; A63B 21/0085; A63B 22/0023; A63B 24/0059; A63B 2071/0072; A63B 2071/0081; A63B 2071/0658; A63B 2071/0694; A63B 2220/53;
(Continued)

(56) References Cited

U.S. PATENT DOCUMENTS 5,980,256 A * 11/1999 Carmein ................ G09B 9/165
482/902
6,743,154 B2 * 6/2004 Epstein .................... G06F 3/011
482/54
(Continued)

OTHER PUBLICATIONS

PCT International Search and Opinion Report, issued on Apr. 13, 2023 for International Application No. PCT/US2023/10937.
(Continued)

*Primary Examiner* — Garrett K Atkinson
(74) *Attorney, Agent, or Firm* — Law Office of Ilya Libenzon (57) ABSTRACT

The invention provides an omnidirectional treadmill system that uses an inner core which is inflated within a tread membrane. On the outside surface of the inflated inner core are ball casters which push outward against the interior of the membrane, resulting in a low friction barrier between the inner core and the inside surface of the tread membrane. The tread membrane rests on a sphere directly below the user in the center of the device. When the sphere is rotated it drives the tread around the stationary inner core. The sphere rotation is accomplished using a holonomic drive system such as motorized omni wheels. The device uses an enclosure which encircles the tread area. The enclosure serves two purposes: to enhance safety of the user and to provide a surface for image projection to the user in virtual reality applications.

9 Claims, 6 Drawing Sheets

(58) Field of Classification Search
CPC .......... A63B 2220/805; A63B 2225/09; A63B 2225/093; A63B 2225/685; A63B 2230/062; A63B 69/0057; A63B 2071/0625; A63B 2071/063; A63B 2071/0647; A63B 2071/0655; A63B 2220/13; A63B 2220/18; A63B 2220/30; A63B 2220/40; A63B 2220/803; A63B 2230/75; A63B 2071/063; A63B 2220/56; A63B 2225/682; A63B 2230/06; A63B 22/0285; A63B 71/0622; A63B 2024/0093; A63B 2071/0691; A63B 2220/22; A63B 2225/50; A63B 2230/04; A63B 2230/207; A63B 2230/42; A63B 2230/50; G06F 3/011; G06F 2203/012

See application file for complete search history.

(56) References Cited

U.S. PATENT DOCUMENTS

| | | | |
|---|---|---|---|
| 7,878,284 B1* | 2/2011 | Shultz | B60C 7/22 180/199 |
| 8,790,222 B2 | 7/2014 | Burger | |
| 8,968,161 B2* | 3/2015 | Shapiro | A63B 26/003 482/4 |
| 9,417,762 B2* | 8/2016 | Frost | G06F 3/011 |
| 10,286,313 B2 | 5/2019 | Goetgeluk et al. | |
| 11,173,364 B2* | 11/2021 | Wang | A63B 69/0035 |
| 11,213,732 B2* | 1/2022 | Zhao | B25J 11/003 |
| 11,543,880 B2* | 1/2023 | Wang | G06F 3/011 |
| 11,911,653 B2* | 2/2024 | Epstein | A63B 22/0285 |
| 2003/0119634 A1 | 6/2003 | Schaeffer | |
| 2004/0048722 A1* | 3/2004 | Epstein | G06F 3/011 482/54 |
| 2004/0106504 A1 | 6/2004 | Reiffel | |
| 2004/0242390 A1 | 12/2004 | Williams | |
| 2007/0270285 A1* | 11/2007 | Gill | A63B 22/02 482/54 |
| 2008/0287267 A1 | 11/2008 | Ellis | |
| 2010/0147430 A1* | 6/2010 | Shultz | B60C 7/18 152/450 |
| 2012/0302408 A1* | 11/2012 | Burger | A63B 22/0242 482/54 |
| 2013/0132910 A1* | 5/2013 | Belmon | A63B 24/0062 715/850 |
| 2014/0192087 A1* | 7/2014 | Frost | G06F 3/0325 345/633 |
| 2015/0321337 A1 | 11/2015 | Stephens, Jr. | |
| 2019/0224521 A1* | 7/2019 | Olsson | A63B 22/0285 |
| 2019/0255382 A1* | 8/2019 | Rudelstorfer | A63B 21/15 |
| 2020/0222750 A1* | 7/2020 | Salicio Castillo | A63B 22/0221 |
| 2021/0034143 A1* | 2/2021 | Wang | A63B 22/0285 |
| 2021/0346755 A1* | 11/2021 | Epstein | A63B 22/0235 |

OTHER PUBLICATIONS

"Holonomic Drive" (Scolton), Apr. 12, 2018 [on-line], retrieved from https://techtv.mit.edu/videos/9392041131714766aa78ffadf4e8c76c/.

* cited by examiner

OMNIDIRECTIONAL TREADMILL SYSTEM

CROSS-REFERENCE TO RELATED APPLICATIONS

This application claims the benefit of U.S. provisional patent application No. 63/300,083 filed on Jan. 17, 2022, the content of which is incorporated herein by reference in its entirety.

TECHNICAL FIELD

Embodiments disclosed herein relate generally to an omnidirectional treadmill system, and more specifically to an omnidirectional locomotion apparatus that can be used in conjunction with virtual reality systems.

BACKGROUND ART

An omnidirectional treadmill (ODT) is a mechanical device that allows a user to perform locomotive motion while remaining in a fixed location. Unlike a traditional belt treadmill where the user is limited to movement in a single direction, an omnidirectional treadmill allows the users to perform locomotive motion in any direction while remaining in a fixed location. Omnidirectional treadmills are employed in immersive virtual environments to allow unencumbered movement within a virtual space.

Principal to omnidirectional treadmill design is maintaining the user centered on a treadmill surface while they perform locomotive actions. There have been various methods employed in the prior art, among them is a design where the treadmill surface consists of a spherical tread membrane which is rotated around an inner core which remains in a fixed position. The rotation of the tread membrane is coordinated with the users' movement such that the user remains centered on the top surface of the tread. These prior art omnidirectional systems utilize a variety of design approaches which result in limitations in their utility for virtual reality applications.

Therefore, there is a need in virtual reality applications for an omnidirectional treadmill system that is safe, cost effective and supports higher rates of unencumbered user locomotion.

SUMMARY OF THE EMBODIMENTS

The present invention provides an omnidirectional treadmill system that uses an inner core which is inflated within a tread membrane. The tread membrane is spherical in shape prior to being stretched by the inner core. The inner core is torus (donut) shaped and when inflated within the tread membrane, stretches the tread membrane to provide a flat surface which the user moves upon. On the outside surface of the inflated inner core are ball casters which push outward against the interior of the membrane, resulting in a low friction barrier between the inner core and the inside surface of the tread membrane.

The tread membrane rests on a sphere directly below the user in the center of the device. The weight of the tread resting on the sphere provides additional tension to the tread surface and enhances the traction of the sphere. When the sphere is rotated it drives the tread around the stationary inner core. The sphere rotation is powered using a holonomic drive system such as motorized omni wheels.

The device includes an outer frame to hold the rotating sphere in a fixed position and to maintain the tread membrane centered on the sphere. The outer frame may include linear actuators which alter the horizontal slope of the tread surface while keeping the sphere in a fixed position. The outer frame has attached ball casters at points where it contacts the tread membrane.

Attached to the outer frame, the device includes an enclosure which encircles the tread area. The enclosure enhances the safety of the device and provides a surface for image projection to the user for virtual reality applications.

The device includes one or more motion cameras configured to provide three-dimensional kinematic analysis of the user's movement while on the device. The user bone analysis is used by the device to:
  a. maintain the user centered on the device using the rotating sphere;
  b. to map the user's actions to actions in a virtual environment;
  c. to control safety features if the user falls; and
  d. to control other features on the device, such as the linear actuators.

Other aspects, embodiments and features of the system and method will become apparent from the following detailed description when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the device and method shown where illustration is not necessary to allow those of ordinary skill in the art to understand the device and method.

BRIEF DESCRIPTION OF THE DRAWINGS

The preceding summary, as well as the following detailed description of the disclosed system and method, will be better understood when read in conjunction with the attached drawings. It should be understood, however, that neither the system nor the method is limited to the precise arrangements and instrumentalities shown.

DETAILED DESCRIPTION OF SPECIFIC EMBODIMENTS

Figure 1:
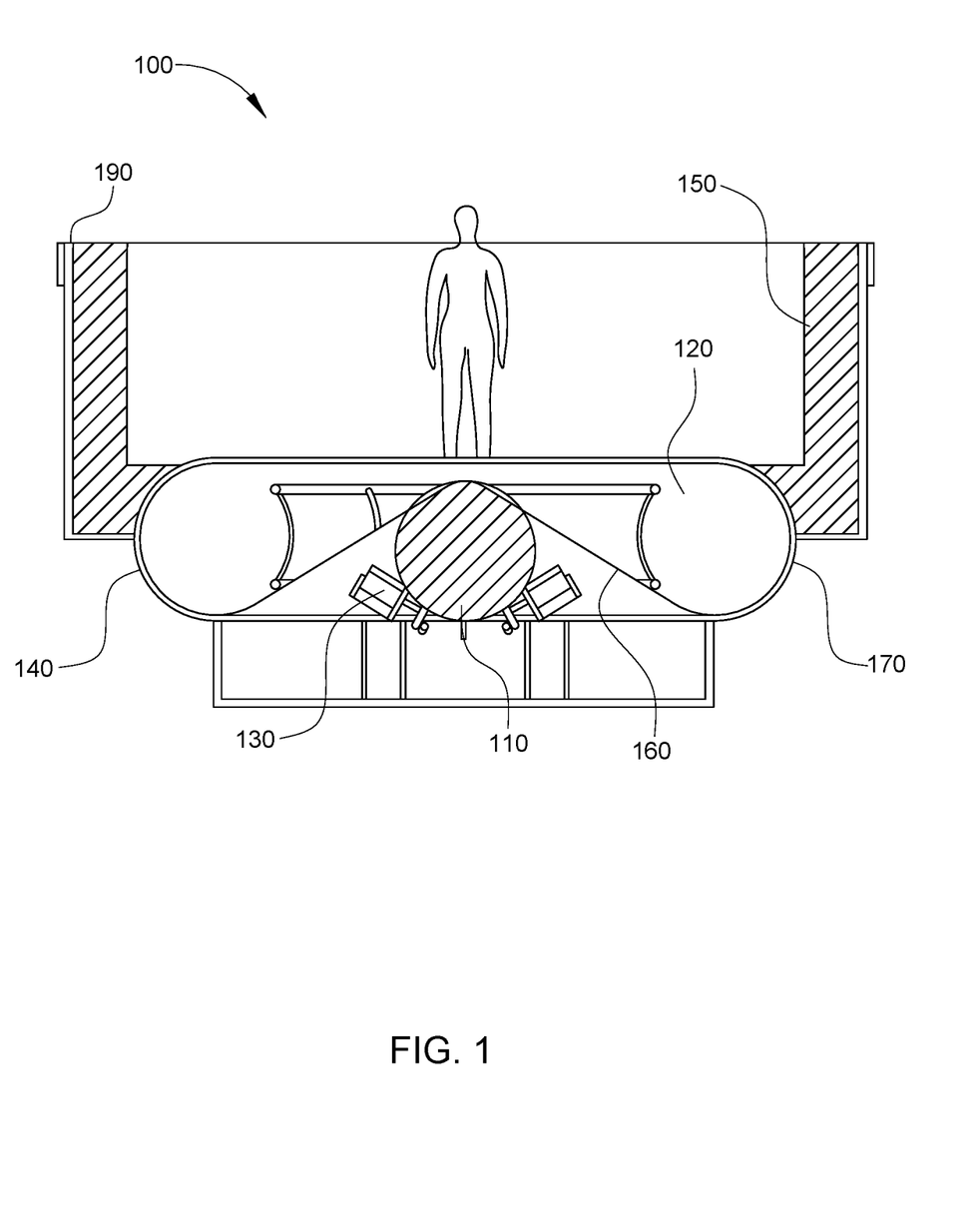
FIG. 1 is a schematic cross-sectional view of a disclosed omnidirectional treadmill system embodying the invention.

Referring now to the drawings in detail, FIG. 1 shows a cross-sectional view of an omnidirectional treadmill system 100 that includes a tread membrane 160 which has been stretched around an inflated inner core 120. The inflated inner core 120 has attached ball casters 140 which provide a low friction barrier between the tread and the inner core.

Figure 5:
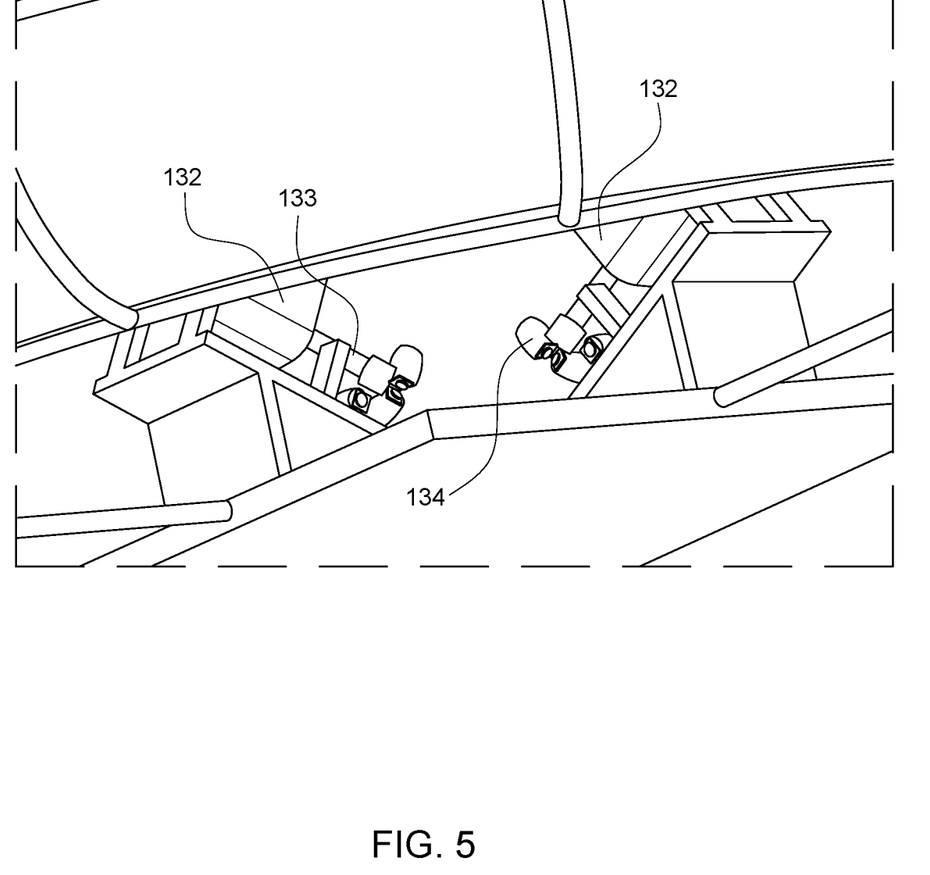
FIG. 5 is an illustration of the holonomic drive system incorporating a plurality of omni wheels coupled to the motors.

The tread and inner core rests on a sphere 110 which allows omnidirectional movement of the tread around the inner core 120. The sphere is driven by a holonomic drive system 130 which in this preferred embodiment uses motorized omni wheels 134 coupled to a corresponding motor 132 and shaft 133 (as shown in more detail in FIG. 5). In a preferred embodiment of the present invention, the holonomic drive system includes four omni wheels, which are wheels with small discs (rollers) around the circumference which are perpendicular to the turning direction.

The outer frame 170 maintains the tread centered on the sphere. The outer frame 170 has an attached barrier 150 which encircles the tread membrane 160. Situated around the outer frame are motion cameras 190 which provide kinematic analysis of the user. The outer frame 170 can be made of a stiff material such as aluminum tube.

Figure 2:
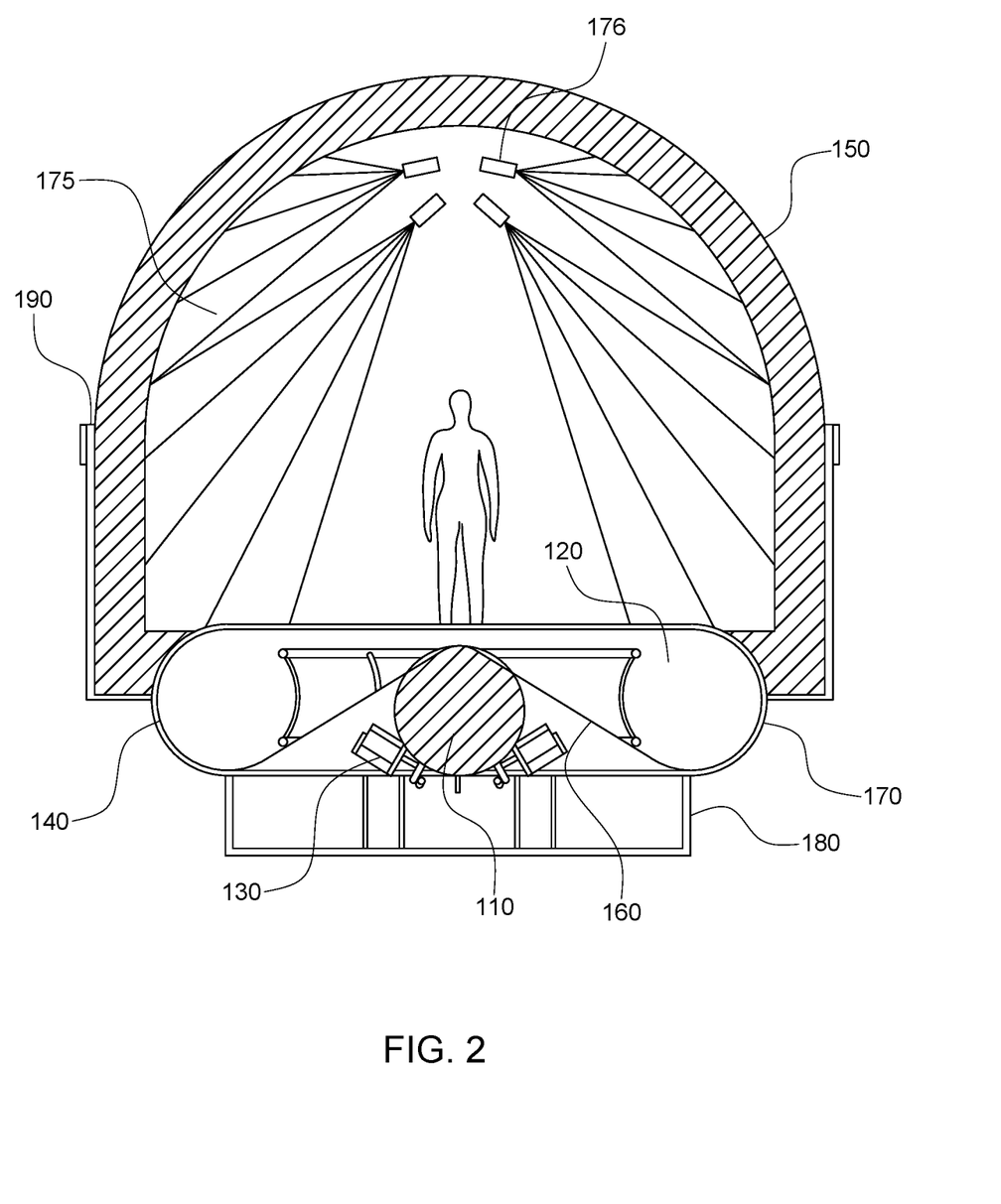
FIG. 2 is a schematic cross-sectional view of a disclosed omnidirectional treadmill system embodying the invention with a fully enclosing inflatable with a projected virtual environment system and actuating gears to alter the tread slope.

FIG. 2 is a cross-sectional view with similar features to FIG. 1 with the following additional features. The FIG. 2 omnidirectional treadmill system 100 includes linear actuating motors 180 attached to the outer frame 170 to alter the horizontal slope of the tread. A dome barrier 150 fully encloses the tread membrane 160; and the system further incorporates a projected light virtual environment system 175 that includes one or more projectors 176 affixed around the perimeter of the dome to project light 176 on surfaces on the enclosed interior.

Figure 3:
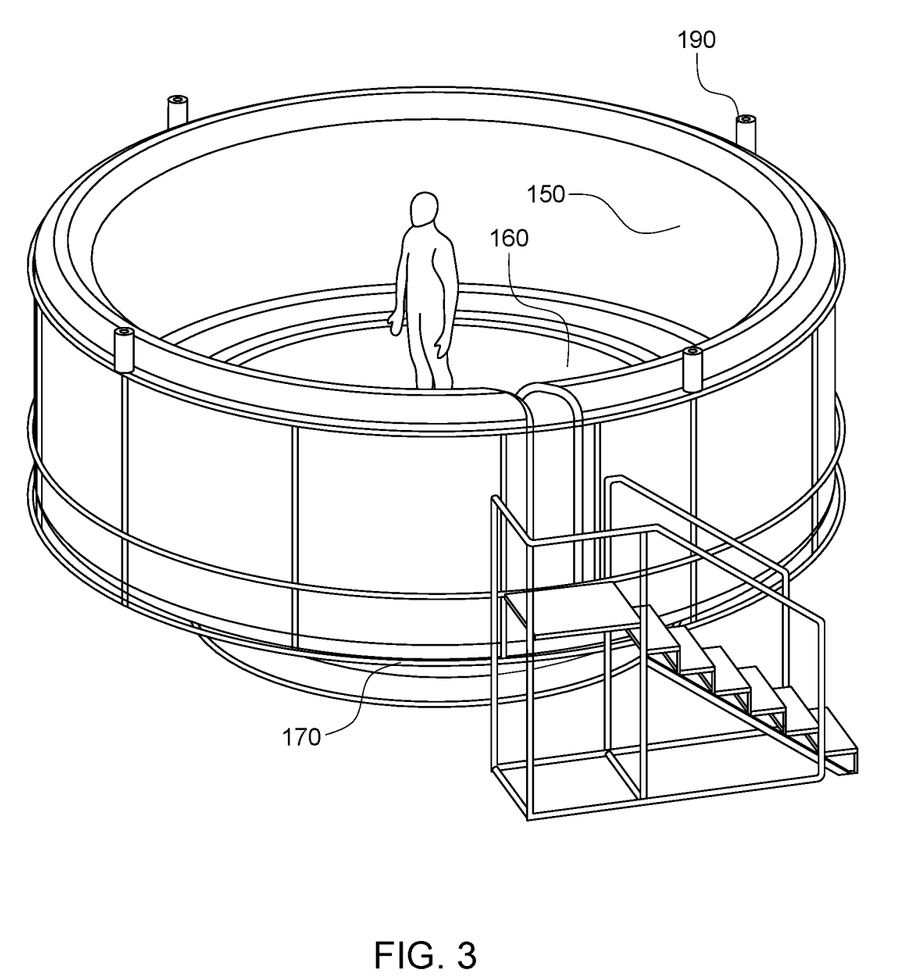
FIG. 3 is a perspective view of the disclosed omnidirectional treadmill system.

FIG. 3 is a perspective view of an omnidirectional treadmill with tread membrane 160, inflated enclosure 150, outer frame 170, and user motion cameras 190.

Figure 4:
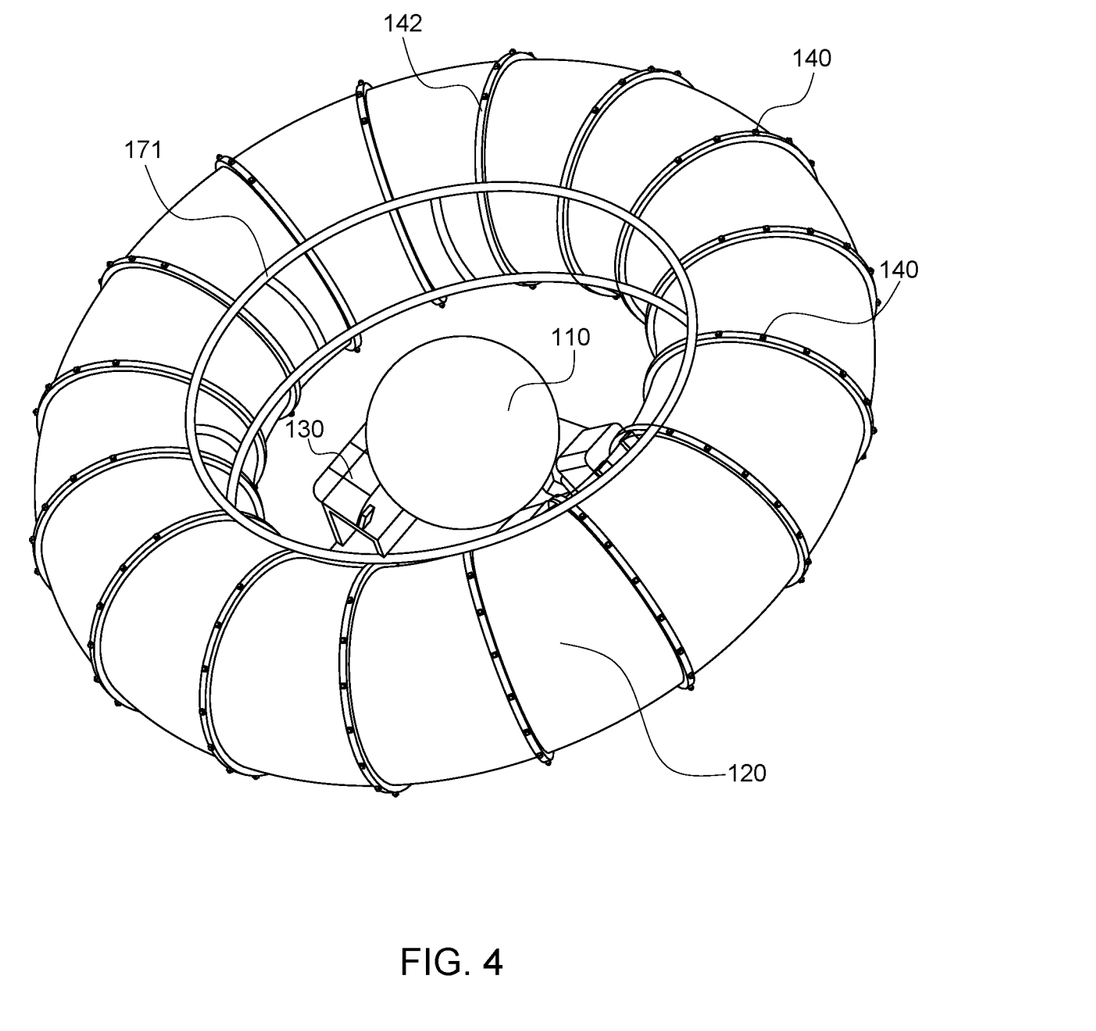
FIG. 4 is a perspective view of the inflatable inner core with ball caster barrier.

FIG. 4 is a perspective view of the inflated inner core 120, the tread sphere 110, and the holonomic drive system 130. The inflated inner core 120 includes a plurality of ball casters 140 disposed on a plurality of corresponding rings 142 encircling the inflated inner core 120 for providing the contact points with the tread membrane. The system further includes an inner frame 171 made from a stiff material such as aluminum pipe to provide for the structural integrity of the inflated inner core 120 and to support a tread deck 172 under the tread surface.

Figure 6:
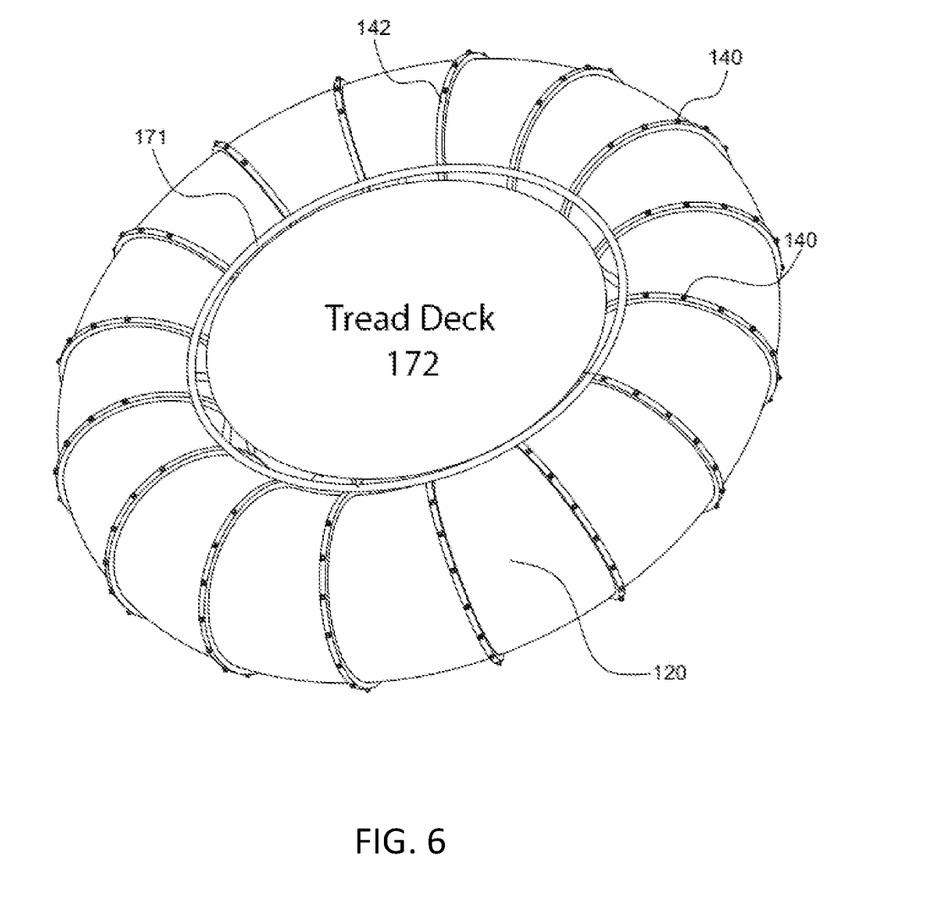
FIG. 6 is a perspective view of the inflatable inner core with a hard tread deck.

The system of the present invention may include safety and trampoline features which minimize injuries associated with falling while utilizing the device. The system may include a hard tread deck 172 below the tread surface to support the user's weight while on the device, as shown in FIG. 6, for example. Below the tread deck 172 the device may provide a means for the tread deck to quickly be vertically lowered and raised using an actuating device such as pneumatic actuators. The system can further include one or more motion cameras 190 configured to determine the user's bone positions on the surface of the treadmill in three dimensional space. Using the motion camera(s), the device may determine that the user is in the process of falling and lower the tread deck vertically at a high rate of speed. When the tread deck is vertically lowered, the falling user impacts the taut tread surface, but their impact no longer reaches the hard tread deck. The result is the user's weight falls only upon the flexible tread, similar to a trampoline, resulting in a softened landing and minimizing injury risk. Similarly, the device may vary the vertical distance of the tread deck from the tread to support trampoline effects for user movement.

While at least one exemplary embodiment has been presented in the foregoing detailed description of the invention, it should be appreciated that a vast number of variations exists. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

The foregoing detailed description is merely exemplary in nature and is not intended to limit the invention or application and uses of the invention. Furthermore, there is no intention to be bound by any expressed or implied theory presented in the preceding technical field, background, brief summary, or the following detailed description.

What is claimed is:

1. An omnidirectional treadmill system, comprising: a tread membrane stretched around a torus-shaped inflated inner core, wherein the inflated inner core applies tension to the tread membrane, forming a taut, flat surface optimized for user locomotion; a plurality of ball casters symmetrically attached to an outer surface of the inflated inner core forming a continuous low-friction barrier by pushing outward against the interior of the tread membrane to add tension, thereby enabling smooth and seamless omnidirectional movement of the tread membrane relative to the inner core; wherein the tread membrane and the torus-shaped inflated inner core rest on a rigid, rotational sphere, slightly raised relative to a surrounding structure, wherein the sphere applies additional tension to the tread membrane by interacting with its underside, thereby enhancing stability, reducing slippage, and improving weight distribution; and wherein the sphere is driven by a holonomic drive system comprising a plurality of independently controllable motors enabling precise and independent movement of the tread membrane in multiple directions.

2. The system of claim 1, further comprising an outer frame for maintaining the tread membrane centered on the sphere.

3. The system of claim 2, wherein the outer frame further comprising an attached barrier encircling the tread membrane.

4. The system of claim 2, further comprising a plurality of linear actuating motors attached to the outer frame for altering the horizontal slope of the tread.

5. The system of claim 1, further comprising a dome barrier fully enclosing the tread membrane.

6. The system of claim 1, further comprising a projected virtual environment system having one or more projectors on a perimeter of a dome barrier; wherein projected light emitted by the virtual environment system is used to provide a virtual environment to a user.

7. The system of claim 1, further comprising an inner frame for providing structural integrity of the inflated inner core.

8. The system of claim 1, further comprising a tread deck attached to the inner frame below the tread which contains a mechanism for vertically actuating the deck.

9. The system of claim 1, further comprising one or more motion cameras configured to determine a user's bone positions on the surface of the tread membrane, wherein the determined positions are used by the system to control the mechanical aspects of the treadmill and to map the user's actions to corresponding actions in a virtual reality environment.

* * * * *